(12) United States Patent
Sawano

(10) Patent No.: US 6,356,292 B1
(45) Date of Patent: Mar. 12, 2002

(54) DENSITY CORRECTION METHOD FOR RECORDING APPARATUS AND DENSITY CORRECTION APPARATUS

(75) Inventor: Mitsuru Sawano, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/628,271

(22) Filed: Jul. 28, 2000

(30) Foreign Application Priority Data

Aug. 16, 1999 (JP) .......................................... 11-229875

(51) Int. Cl.$^7$ ................................................. B41J 2/47
(52) U.S. Cl. ........................................ 347/251; 347/240
(58) Field of Search ........................... 347/14, 19, 229, 347/240, 248, 251, 262, 264, 15; 382/167

(56) References Cited

U.S. PATENT DOCUMENTS 5,173,950 A * 12/1992 Sato et al. .................. 382/167
5,276,459 A * 1/1994 Danzuka et al. ............. 347/14
5,444,468 A * 8/1995 Fukushima et al. .......... 347/14

* cited by examiner

*Primary Examiner*—N. Le
*Assistant Examiner*—Hai C. Pham
(74) *Attorney, Agent, or Firm*—Sughrue Mion, PLLC (57) ABSTRACT

The density correction method according to the present invention includes recording an image on said recording medium at a predetermined halftone density, measuring record density of a result of recording of the halftone density by a densitometer, raising the relative speed between the recording head and the recording medium when the measured record density is higher than the required density and lowering the relative speed when the measured record density is lower than the required density, recording an image on said recording medium at two or more halftone densities after a set value of the relative speed has been changed, and updating a density conversion table for converting input data in such a manner that the record density of a result of recording substantially coincides with the predetermined density.

12 Claims, 6 Drawing Sheets

DRUM ROTATIONAL SPEED CONVERSION TABLE

| HALF DOT % A | ROTATIONAL SPEED (rpm) |
|---|---|
| 54 | 470 |
| 57 | 500 |
| 60 | 530 |
| 63 | 560 |
| 66 | 590 |

FIG. 6

| DENSITY OF MEASURED PORTION (%) | REQUIRED DENSITY RANGE D (%) |
|---|---|
| 10 | 12 ~ 14 |
| 20 | 24 ~ 26 |
| 30 | 36 ~ 38 |
| 40 | 48 ~ 50 |
| 50 | 59 ~ 61 |
| 60 | 68 ~ 70 |
| 70 | 77 ~ 79 |
| 80 | 85 ~ 87 |
| 90 | 93 ~ 95 |

DENSITY CORRECTION METHOD FOR RECORDING APPARATUS AND DENSITY CORRECTION APPARATUS

BACKGROUND OF THE INVENTION

The present invention relates to a density correction method for recording apparatus and density correction apparatus in order to adjust recording density for a scanning type recording apparatus for performing a recording operation by using a laser beam, a thermal head or an LED. This correction technology is suitably applied to, for example, an outer-drum recording apparatus for performing a recording operation by carrying out exposure to a recording medium on a recording rotational drum.

In recent years, a multi-function image forming. apparatus has been manufactured which is arranged as follows: heat energy is applied to a toner sheet incorporating a thin film to transfer a thin film in the form of an image from the toner sheet to a recording medium which is a recording medium by using a separation phenomenon. Thus, an area-changed image and/or a line image, such as characters, is formed to form a color image, and more particularly, to form a color proof (DDCP: Direct Digital Color Proof) in a printing industrial field, form a white and black image, make a plate, manufacture filters and manufacture a printed circuit board.

The conventional multi-function image forming apparatus sometimes encounters change in the substantial density (the density in a case of a density gradation system and a record area ratio rate in actual in a case of a system for recording halftone dots) of an image recorded on a recording material owing to dimension errors of each portion, difference between recording materials among lots, change in the laser output as time elapses.

Hitherto, correction is performed by changing an electric current which is supplied to a laser output apparatus for performing exposure or time for which the exposing electric current is changed to be adaptable to the situation. Thus, the undesirable change in the substantial density of the image has been prevented. The foregoing method suffers from a problem in that a circuit for delicately adjusting the electric current and a circuit for delicately adjusting electric current pulse are required. Thus, the circuit becomes too complicated.

When an amount which must be corrected becomes different according to the gradation, the correction current and correction pulse width must be determined for each pixel. Thus, there arises a problem in that excessively complicated control must be performed.

A method has been employed with which input data is corrected with software to correct the density gradation of an obtained image. The foregoing method, which is capable of correcting all the gradation without a necessity for any complicated control, cannot perform the control in a case where color shift out of maximum gradation width capable to record, such as excessively intense highlight or unsatisfactorily thin shadow, occurs.

SUMMARY OF THE INVENTION

In view of the foregoing, an object of the present invention is to provide a density correction method for a recording apparatus and a density correction apparatus, which is capable of adequately correcting the density of all the gradation without any necessity for a complicated control circuit and which permits satisfactory productivity.

To achieve the foregoing object, a density correction method for a recording apparatus which performs recording by applying energy corresponding to input data from a recording head to a recording medium according to the first aspect of the present invention comprises recording an image on the recording medium at a predetermined halftone density, measuring record density of a result of recording of the halftone density, changing the setting value of a relative speed between the recording head and the recording medium by means of raising the relative speed when the measured record density is higher than the required density and lowering the relative speed when the measured record density is lower than the required density, recording an image on the recording medium at least two halftone densities after changing the setting value of the relative speed, and updating a density conversion table for converting input data in such a manner that the record density of a result of recording substantially coincides with the predetermined density.

The foregoing density correction method is arranged such that the relative speed between the recording head and the recording medium, for example, between the rotational speed of the recording rotational drum supporting the recording medium and the speed at which the recording medium is moved, is changed. Thus, the predetermined halftone record density is adjusted, and then the density of input data is changed by the record-density changing means in accordance with a result of recording which has been recorded as at. lest two types of halftones. Thus, only a simple control circuit is required to adequately adjust the density of all the gradation. Since greatest use of the energy applied to the recording head is permitted, the productivity (the recording speed or the like) which is required when the recording apparatus is used can significantly be improved.

Preferably, according to the second aspect of the invention, the recording head is a laser recording head for outputting a laser beam, and the recording medium is a laser thermal transfer material on which an image is formed owing to irradiation with said laser beam.

The foregoing density correction method is able to set the greatest energy which is supplied to the laser recording head, the laser output from which determines the productivity. Therefore, a high speed recording can be performed.

Further, according to third aspect of the invention, the relative speed setting value is changed from the recorded halftone density in accordance with the correspondence between a record density, which has been measured, and the relative speed.

According the foregoing method, the correspondence between the record density and the relative speed is previously measured. Thus, the relative speed. which must be set can immediately be obtained from the recorded halftone density.

A density correction apparatus according to the fourth aspect of the invention using a computer programmed to perform a density correction for a recording apparatus which performs recording by applying energy corresponding to input data from a recording head to a recording medium said density correction apparatus comprises a first recorder which records a first image on the recording medium at a predetermined halftone density, a relative speed setting value changer which measures the recording density of the first image and which changes the setting value of the relative speed between said recording head and the recording medium by means of raising the relative speed when the measured record density is higher than the required density and lowering the relative speed when the measured record density is lower than the required density, a second recorder which records a second image on the recording medium at-least two halftone densities after a set value of the relative speed has been changed and input-data-density conversion table updater which updates a density conversion table for converting input data in such a manner that the recorded density of the second image substantially coincides with the predetermined density.

The foregoing density correction apparatus is arranged such that the relative speed between the recording head -and the recording medium, for example, between the rotational speed of the recording rotational drum supporting the recording medium and the speed at which the recording medium is moved, is changed by the relative speed setting value changer. Thus, the predetermined halftone record density is adjusted, and then the density of input data is changed by the record-density changing means in accordance with a result of recording which has been recorded as at lest two types of halftones. Thus, only a simple control circuit is required to adequately adjust the density of all the gradation. Since greatest use of the energy applied to the recording head is permitted, the productivity (the recording speed or the like) which is required when the recording apparatus is used can significantly be improved.

Preferably, according to the fifth aspect of the invention, the recording head is a laser recording head for outputting a laser beam, and the recording medium is a laser thermal transfer material on which an image is formed owing to irradiation with said laser beam.

The foregoing density correction apparatus is able to set the greatest energy which is supplied to the laser recording head, the laser output from which determines the productivity. Therefore, a high speed recording can be performed.

Further, according to sixth aspect of the invention, the relative speed setting value is changed from the recorded halftone density in accordance with the correspondence between a record density, which has been measured, and the relative speed.

According the foregoing apparatus, the correspondence between the record density and the relative speed is previously measured. Thus, the relative speed which must be set can immediately be obtained from the recorded halftone density.

DETAILED DESCRIPTION OF THE PREFERRED EMBODIMENT

Figure 1:
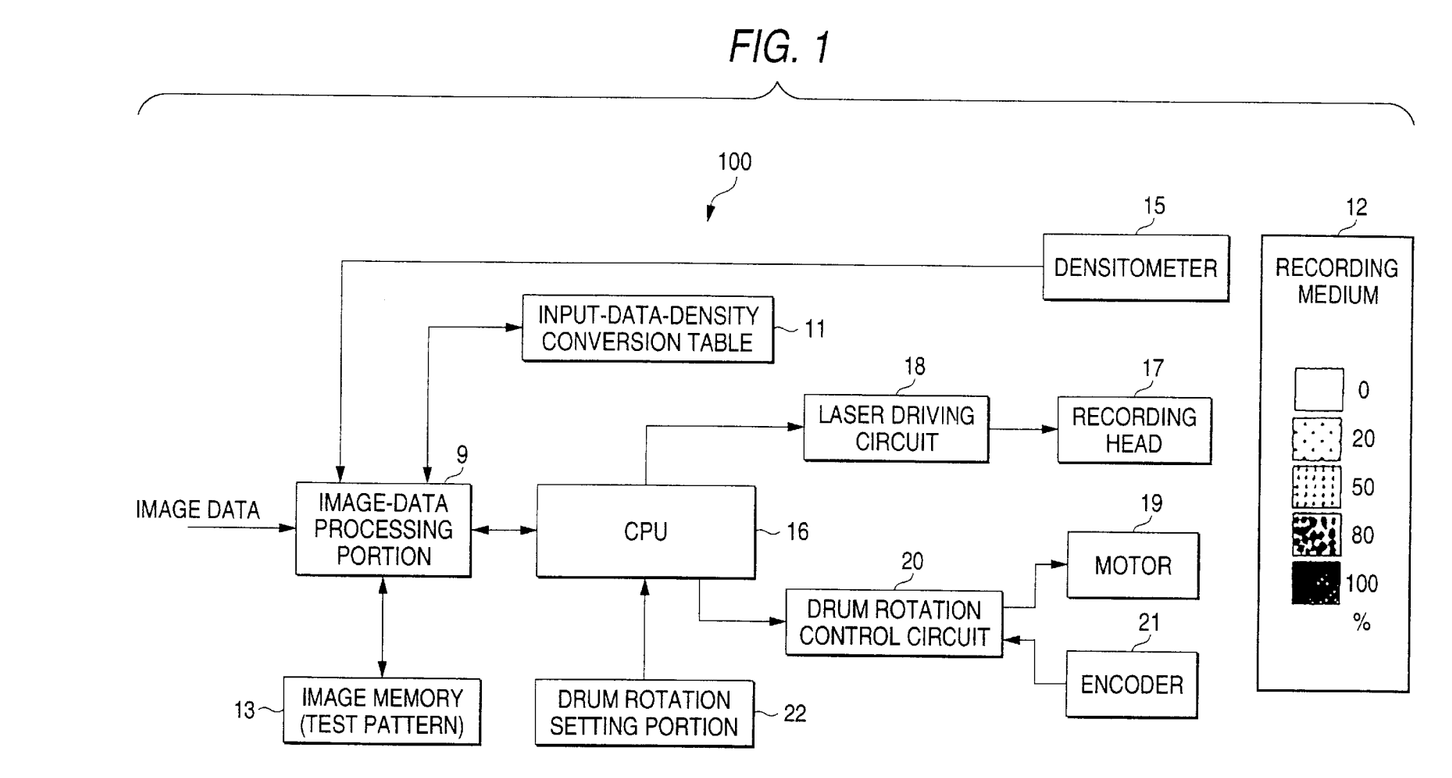
FIG. 1 is a functional block diagram showing a recording apparatus according to the present invention.
Figure 2:
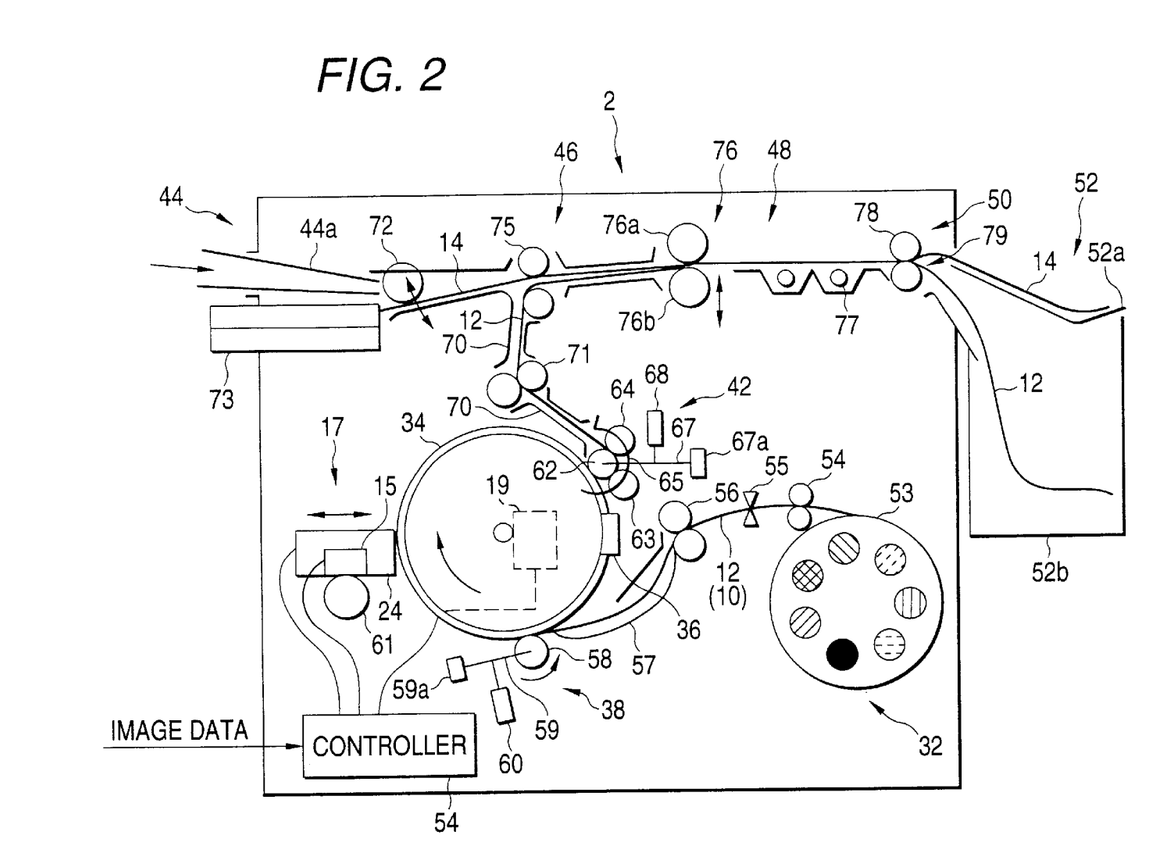
FIG. 2 is a diagram showing the specific structure of the recording apparatus according to the present invention.
Figure 3:
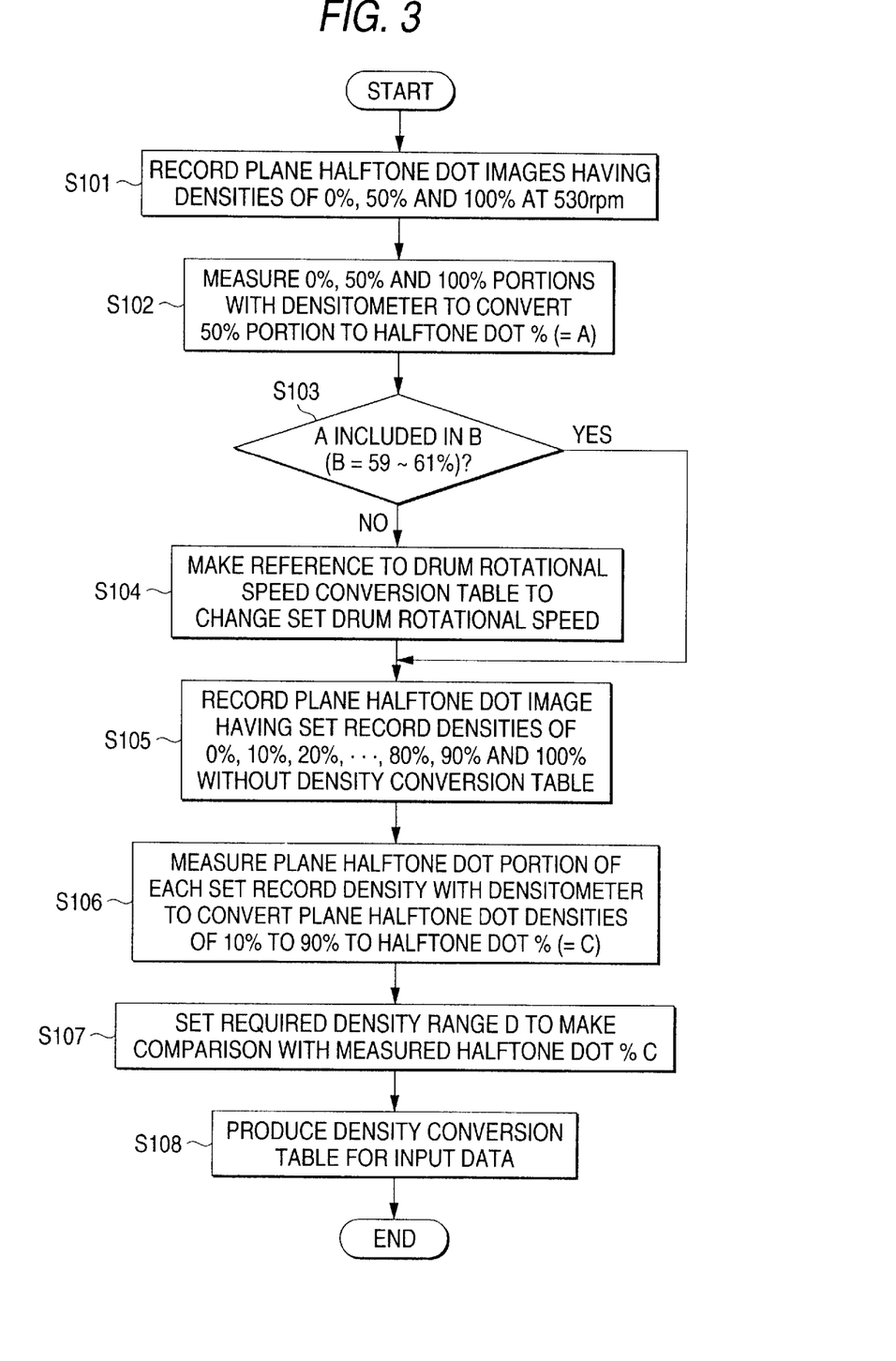
FIG. 3 is a flow chart showing a process for converting the density of input data of the recording apparatus according to the present invention.

An embodiment of a density correction method for a recording apparatus and a density correction apparatus according to the present invention will now be described with reference to the drawings FIG. 1 is a functional block diagram showing a density correction apparatus according to the present invention. FIG. 2 is a schematic view sowing the recording apparatus according to the present invention. FIG. 3 is a flow chart showing a process for making a density conversion table for the apparatus according to the present invention.

As shown in FIG. 1, a density correction apparatus 100 according to the present invention incorporates an image-data processing portion 9 for receiving image data supplied from outside to perform image processes, such as adjustment of the density of introduced data; an input-data-density conversion table 11 for changing the gradation of input data to be adaptable to the characteristics or the like of the recording apparatus; an image memory 13 in which a test pattern and the like are stored; a densitometer 15 for measuring the density of the image recorded on a recording medium; a CPU 16 for controlling each unit; a recording head 17 for recording an image on the recording medium 12; a laser driving circuit 18 for supplying a laser beam to the recording head 17; a motor 19 for rotating a recording rotational drum 34 (see FIG. 2) which is fit the recording medium; a drum-rotation-control circuit 20 for controlling the motor 19; an encoder 21 for measuring the number of rotations of the recording rotational drum 34; and a rotational-speed setting portion 22 for setting the number of rotations of the recording rotational drum 34.

The image-data processing portion 9 and the input-data-density conversion table 11 correspond to the record-density changing means, while the drum-rotation-control circuit 20, the motor 19 and the recording rotational drum 34 correspond to the relative-speed control means.

FIG. 2 shows a specific example of the structure of the recording apparatus 2. The recording apparatus 2 is capable of forming a full-color image and provided with a recording medium (a photosensitive material) supply portion 32; a recording rotational drum 34 for forming an image; a recording medium fixing/releasing mechanism 36 disposed on the recording rotational drum 34; a laminating mechanism 38 disposed along the outer surface of the recording rotational drum 34; a recording head 17; a separation mechanism 42; a paper feeding portion 44; a laminating portion 46; a fixing portion 48; a separation portion 50; a tray portion 52; a controller 84; and a motor 19 for rotating the recording rotational drum 34.

The operation of the recording apparatus 2 will schematically be described. The recording medium supply portion 32 supplies, to the outer surface of the recording rotational drum 34, an image receiving sheet 12 as a recording medium and then supplies a toner sheet 10. Then, the image receiving sheet 12 is secured to the surface of the recording rotational drum 34 by the recording medium fixing/releasing mechanism 36. After the image receiving sheet 12 is put round the recording rotational drum 34, the toner sheet 10 is put round the surface of the image receiving sheet 12 while the laminating mechanism 38 is operated to heat and press the toner sheet 10. Then, each sheet is laminated on the recording rotational drum 34. The toner sheet 10 and the image receiving sheet 12 may be laser thermal transfer materials or the like.

Then, the recording head 17 arranged to be controlled by the controller 54 in response to an image signal is operated to perform a laser exposure of the toner sheet 10 to correspond to the shape of the image. Thus, the image is recorded as a latent image. Then, the separation mechanism 42 is operated to separate the toner sheet 10 from the image receiving sheet 12 secured to the outer surface of the recording rotational drum 34. Then, the image recorded on the toner sheet 10 is transferred to the image receiving sheet 12 so that the image is developed. Hence it follows that the image is formed on the image receiving sheet 12.

The foregoing process is repeated for the other three or four colors so that a color image is formed on the image receiving sheet 12. The image receiving sheet 12 and a printing paper 14 supplied from the paper feeding portion 44 are laminated and allowed to adhere to each other in the laminating portion 46.

Then, the image receiving portion of the image receiving sheet 12 is photo-cured in the fixing portion 48. Then, the image receiving sheet 12 and the printing paper 14 are separated from each other in the separation portion 50. Then, the printing paper 14 having the full-color image formed thereon is discharged to a proof tray 52a, while the used image receiving sheet 12 is discharged to a waste-material stacker 52b. Thus, a hard copy of the full-color image can be obtained.

The components of the recording apparatus 2 will now be described.

The recording medium supply portion 32 incorporates a recording medium station 53 for storing the rolled image receiving sheet 12 and a plurality of toner sheets 10, for example, standard toner sheets in Y, M, C and K and a rolled recording medium such as a sheet in a special color for use in the printing industry field; a pair of drawing rollers 54 for drawing one recording medium; a cutter 55 for cutting, into a sheet shape, the recording medium drawn from the recording medium station 53 for a predetermined length; a pair of rollers 56 for holding and moving the sheet recording medium; and a guide 57 for guiding the sheet recording medium to the surface of the recording rotational drum 34 so as to guide the leading end of the recording medium to a fixed position of a recording medium fixing/releasing mechanism 36 joined to the surface of the recording rotational drum 34.

First, the image receiving sheet 12 is supplied to the recording rotational drum 34 for forming an image. The leading end of the image receiving sheet 12 is secured to the recording medium fixing/releasing mechanism 36 by a clamp or the like. When the recording rotational drum 34 has been rotated in the direction indicated with an arrow shown in the drawing, the foregoing leading end is wound up. Also the rear end of the image receiving sheet 12 is secured by the recording medium fixing/releasing mechanism 36. It is preferable that either of the leading-end securing portion of the recording medium fixing/releasing mechanism 36 or the rear-end securing portion of the same is movable on the outer surface of the recording rotational drum 34 in such a manner that securing of recording medium sheets having various lengths is permitted.

Then, the toner sheet 10 moved from the recording medium supply portion 32 is similarly wound on the image receiving sheet 12 wound around the recording rotational drum 34. The toner sheet 10 is laminated on the image receiving sheet 12 by the laminating mechanism 38. The laminating mechanism 38 incorporates a laminating roller 58 including a heater (not shown); an arm 59 for rotating the laminating roller 58 around a support point 59a to bring the same into contact with the outer surface of the recording rotational drum 34; and a pressing means 60 for pressing the laminating roller 58 against the outer surface of the recording rotational drum 34 with a predetermined pressure.

The pressing means 60 may be an urging means, such as a spring, or a manipulator of an air cylinder and like. The image receiving layer which is the outermost layer of the image receiving sheet 12 has adhesiveness. Therefore, a laminate process, the image receiving sheet is adhered to the toner sheet, can be performed such a manner that the toner sheet 10 is pressed with a predetermined pressure by the laminating roller 58 so as to be wound around the image receiving sheet 12. As a result, occurrence of any crease of the toner sheet 10 can be prevented. Moreover, the image receiving layer of the image receiving sheet 12 and the toner layer (recording area) of the toner sheet 10 can be bonded to each other with uniform bonding force.

As described above, the laminate process of the toner sheet 10 to the image receiving sheet 12 is performed to press the sheets in order to uniformly and strongly bond the toner sheet 10 onto the image-receiving sheet 12. It is as well as preferable that the laminating roller 58 for pressing the toner sheet 10 is heated to enlarge the bonding force.

In the drawing, the laminating roller 58 is employed to perform the laminate process of the toner sheet 10 onto the image-receiving sheet 12. Any unit may be employed when the unit is able to press and laminate the toner sheet 10 onto the image-receiving sheet 12. As an alternative to this, a rod-like pressing member having a smooth leading end may be employed.

When the image-receiving sheet 12 is wound around the recording rotational drum 34, it is preferable that the leading end of the image-receiving sheet 12 is secured by the recording medium fixing/releasing mechanism 36. Moreover, the rollers 56, the laminating roller 58 or another member is used to hold another portion of the image-receiving sheet 12. Thus, a predetermined tension is applied to the image-receiving sheet 12 when it is wound around the outer surface of the recording rotational drum 34. In the foregoing case, the outer surface of the recording rotational drum 34 may be pierced to adsorb the image-receiving sheet 12 by using an adsorbing means. It is preferable that the adsorbing means and the recording medium fixing/releasing mechanism 36 are used simultaneously. Either of the means may be used. Thus, occurrence of any crease can be prevented and position deviation does not occur when the image-receiving sheet 12 is secured to the outer surface of the recording rotational drum 34.

It is preferable that a tension is also applied to the toner sheet 10 when the toner sheet 10 is laminated on the image-receiving sheet 12. Similarly to the operation for winding the image-receiving sheet 12, the recording medium fixing/releasing mechanism 36 may be used to secure the leading end and/or the rear end of the toner sheet 10. As an alternative to this, the foregoing adsorbing means may as well as be used. It is preferable that the tension which is applied to the toner sheet 10 when the laminating operation is performed is smaller than the tension which is applied to the image-receiving sheet 12 when the image-receiving sheet 12 is wound round the recording rotational drum 34.

The recording head 17 incorporates a laser head 24 which includes a modulation means and which is constituted by a laser-beam source (not shown) for emitting high-sensitive energy light, such as a laser beam, an image-forming lens for adjusting the diameter of laser beam spot and the like and a sub-scanning means 61 for moving the laser head 24 in the axial direction of the recording rotational drum 34 to perform a sub-scanning operation. The main scanning operation of the toner sheet 10 by using the laser beam is performed by rotating the recording rotational drum 34.

The speed of rotations of the recording rotational drum 34 can be changed by the controller 84 which includes the drum-rotation-control circuit 20 (see FIG. 1) and which controls the motor 19. To improve the accuracy, the encoder 21 (see FIG. 1) performs feedback control. This embodiment is structured such that the speed of rotations of the recording rotational drum 34 is adjusted to adjust the record density as described later. Another structure may be employed in which the exposing head 40 is not provided with the sub-scanning means 61. In the foregoing case, the recording rotational drum 34 is provided with an axial-directional moving means. In the foregoing case, the recording rotational drum 34 is moved in the axial direction to perform a sub-scanning while rotation and main scanning of the recording rotational drum 34 are being performed.

The laser-beam source may be a source which is capable of emitting high-density energy light with which heat-mode exposure can be performed. For example, gas laser, such as argon-ion laser, helium neon laser or helium-cadmium laser; solid laser, such as YAG laser; semiconductor laser; dye laser; or excimer laser may be employed. The laser beam for use in the present invention to record an image may be a laser beam directly emitted from the foregoing laser or light obtained by causing emitted light above to pass through a secondary higher-harmonic-wave device and thus having a halved wavelength.

A laser is selected to be adaptable to the sensitive wavelength and the sensitivity of the toner sheet 10 and required recording speed. It is most preferable that the semiconductor laser is employed from a viewpoint of cost reduction, output power, the size and modulation easiness.

The modulation of the laser beam which is performed in response to an image signal is realized by a known method with which a laser beam is allowed to pass through an external modulator in a case of the argon ion laser. In a case of the semiconductor laser, an electric current which is supplied to the laser is controlled (directly modulated) in response to a signal. The size of the laser spot which is converged on the photothermo-conversion layer and the scanning speed are determined to be adaptable to a resolution required for the image and the record sensitivity of the material. In general, high resolution is required in a case of a printing operation. Therefore, it is preferable that the size of the beam spot is minimized. In the foregoing case, the focal depth is, however, reduced. Thus, mechanical control cannot easily be performed.

In a case where the scanning speed is excessively low, great heat loss takes place owing to heat conduction to a support member of the toner sheet 10 or the like. Thus, the energy efficiency deteriorates and time required to complete the recording operation is excessively elongated. Therefore, the recording conditions according to the present invention are such that the diameter of the beam on the photo thermo-conversion layer is 5 $\mu$m to 50 $\mu$m, more preferably 6 $\mu$m to 30 $\mu$m and the scanning speed is 1 m/second or higher, more preferably 3 m/second or higher.

The image signal is supplied from an external image reading unit of the recording apparatus 2 according to the present invention, a work station (W/S) having a DTP function, an electronic publishing system or any one of a variety of recording mediums (a magnetic tape, a floppy disk, a hard disk, a RAM card or the like) to a color management system (a color image reproducing system). Thus, matching of the color space and so forth are performed, and then the image signal is, as a digital signal, transmitted to the controller 84 through SCSI interface and the like so as to be subjected to required processes. Then, the signal is transmitted to the recording head 17 so that control of the heat mode exposure of the laser head 24 is performed.

The controller 84 controls the sub-scanning operation which is performed by the sub-scanning means 61 of the recording head 17 and the rotation and main scanning of the recording rotational drum 34. Moreover, the controller 84 controls the component units of the recording apparatus 2 according to the present invention and the overall sequence.

The separation mechanism 42 separates, from the image-receiving sheet 12, the toner sheet 10 having an image in the form of a latent image obtained owing to the heat mode exposure of the recording head 17. Moreover, the separation mechanism 42 separates and transfers the latent image formed on the toner sheet 10 to the image-receiving sheet 12. The separation mechanism 42 incorporates a separation roller 62; two division rollers 63 and 64 arranged to be brought into contact with the separation roller 62; a comb-blade guide plate 65 disposed between the division rollers 63 and 64 along the separation roller 62; and a bracket (not shown) for integrally joining the foregoing elements.

The separation roller 62 is structured to pivotally be supported by the arm 67 so as to rotate around a support point 67a. The separation roller 62 can be brought into contact with the surface of the recording rotational drum 34 and separated from the same. A pressing means 68 is provided which presses the separation roller 62 against the laminate of the image-receiving sheet 12 and the toner sheet 10 on the recording rotational drum 34 through the arm 67.

The heat-mode exposure is performed so that heat energy is applied to the latent image to reduce the bonding force of the toner layer. Therefore, the arm 67 is rotated around the support point 67a to bring the bracket closer to the laminate of the toner sheet 10 having the image in the form of the latent image and the image receiving sheet 12 having the image receiving layer to which the toner sheet 10 has been bonded. Thus, the comb-blade guide plate 65 is inserted between the image receiving layer of the image receiving sheet 12 of the laminate and the toner layer of the toner sheet 10. Moreover, the separation roller 62 presses the laminate from a position adjacent to the toner sheet 10.

When the length of joining of either of the toner sheet 10 or the image receiving sheet 12 is changed, the comb-blade guide plate 65 can easily be inserted between the toner sheet 10 and the image receiving sheet 12. Then, the recording rotational drum 34 is rotated. Moreover, the separation roller 62 and the division rollers 63 and 64 are rotated so as to move the leading end of the toner sheet 10 along the comb-blade guide plate 65. Thus, the leading end of the toner sheet 10 is sandwiched between the separation roller 62 and the division roller 63.

Thus, while pressing the toner sheet 10 by the separation roller 62, the toner sheet 10 is sandwiched and moved between the separation roller 62 and the division rollers 63 and 64. Thus, the toner sheet 10 is separated from the image receiving sheet 12. As described above, the toner sheet 10 can be separated at predetermined separating speed in the portion of the toner sheet 10 which is pressed by the separation roller 62. Since the separating force which is exerted on the image receiving sheet 12 when the separation is performed is not changed, the position at which the image receiving sheet 12 is secured to the recording rotational drum 34 is not deviated. As a result, any vibration phenomenon, such as sticks and slips, does not take place. Therefore, deterioration in the position accuracy does not occur. Hence it follows that a monochromatic halftone-dot image exhibiting high image quality, high resolution and large number of the gradation and free from any irregular separation and position deviation can be obtained.

By repeating the foregoing processes for every color, the image receiving sheet 12 having the images in four colors consisting of C, M, Y and K, the positions of which have accurately been aligned and subjected to the separating, transferring and developing processes is obtained. The image receiving sheet 12 is moved by a moving roller pair 71 while the image receiving sheet 12 is being guided by guide members 70. Thus, the image receiving sheet 12 is moved to the laminating portion 46.

In the laminating portion 46, the printing paper supply roll 72 delivers printing paper 14 from a printing paper cassette 73 in synchronization with the movement of the image receiving sheet 12. The printing paper 14 is moved to resist roller pair 75 while the printing paper 14 is being guided by the guide members 70. The printing paper 14 may be supplied to the printing paper supply roll 72 through a manual paper feeding tray 44a.

Then, the image receiving sheet 12 and the printing paper 14 are laminated while the image receiving sheet 12 and the printing paper 14 are being aligned by the resist roller pair 75. Then, the image receiving sheet 12 and the printing paper 14 are moved to the fixing portion 48. In the fixing portion 48, the image receiving sheet 12 and the printing paper 14 laminated in the laminating portion 46 are sandwiched by the heating and fixing roller pair constituted by a pressing roller 76a and a heated roller 76b while heating and fixing are being performed. Then, a post exposure lamp 77, such as an ultraviolet lamp, is used to harden the laminate in such a manner that the image receiving layer of the image receiving sheet 12 can furthermore easily be separated.

In the separation portion 50, the separation roller pair 78 and the separation guide 79 harden the laminate so that the image receiving layer which can easily be separated is separated from the image receiving sheet 12. Then, the image receiving layer is bonded to the printing paper 14 so that the image is transferred. The printing paper 14 having the image transferred thereto is, as a hard copy, discharged to the proof tray 52a of the tray portion 52. The image receiving sheet 12 from which the image receiving layer has been separated is discarded to the waste tray 52b.

A density correction method for the density correction apparatus having the recording apparatus 2 will now be described with reference to FIGS. 1 and 3 to 6. The density correction method includes (1) a step for recording a predetermined halftone image at the reference relative speed between the image receiving sheet 12 and the recording head 17;

(2) a step for measuring the density of the record image to make a comparison between the density and a predetermined required density range;

(3) a step for changing a set value such that the relative speed is raised when the measured density is higher than the required density range and the relative speed is reduced when the measured density is lower than the foregoing range;

(4) a step for recording an image having at least two types of halftones at the set relative speed which has been changed;

(5) a step for measuring densities of at least two types of halftone portions of the recorded image; and (6) a step for updating the value of a density conversion table of input data for changing input data in such a manner that the measured record densities of at least two points satisfy a required density range.

Each process will now be described. As shown in a flow chart of each process shown in FIG. 3, the reference rotational speed of the recording rotational drum 34 is set to be, for example, 530 rpm. Then, the recording rotational drum 34 is rotated to record plane halftone dot images having the set record densities, previously stored in the image memory 13, of 0%, 50% and 100% (steps 101, and hereinafter expression will be made such as "S101"). The "plane halftone dot image" is a halftone dot image having a uniform density. Note that the set record density must contain at least one halftone density.

Then, the densitometer 15 is used to measure a recorded portion of the plane halftone dot image recorded in S101 and having the set record density of 50%. The obtained density is converted into a halftone dot percent (hereinafter called a "halftone dot %") A which is the ratio of a printed area (including optically dispersed component) per unit area (S102).

Figure 4:
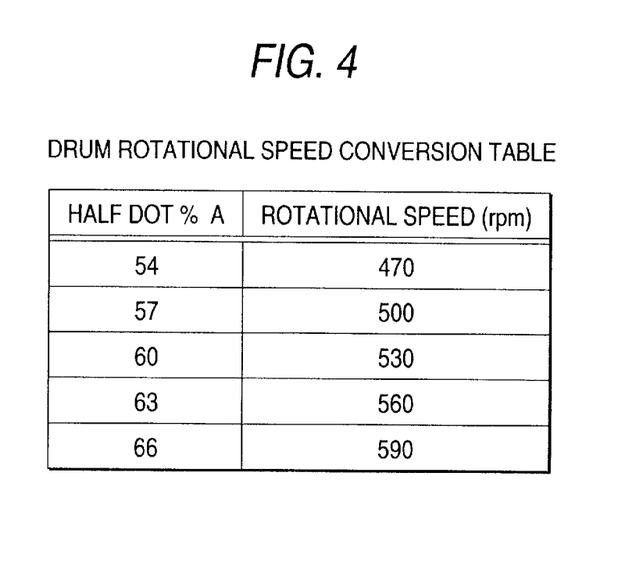
FIG. 4 is a diagram showing a drum rotational-speed conversion table of the recording apparatus according to the present invention.

Then, whether or not the obtained record density A satisfies a required record density range B is determined (S103). The required record density range B is, in the foregoing case, set to be, for example, 59% to 61%. When a determination has been made that the halftone dot % A does not satisfy the required record density range B, the rotational-speed setting portion 22 changes a reference to the drum rotational speed conversion table shown in FIG. 4 is made to change the set value of the rotational speed of the recording rotational drum 34 (S104). When a determination has been made in S103 that the halftone dot % A satisfies the required density range B, the operation proceeds to S105.

The rotational-speed setting portion 22 arranges the drum rotational speed conversion table such that when the halftone dot % A is lower than the required density range B, the rotational speed of the recording rotational drum is reduced to reduce the relative speed between the recording head 17 and the image receiving sheet 12. When the halftone dot % A is higher than the required density range B, the rotational speed of the recording rotation drum is raised to raise the relative speed between the recording head 17 and the image receiving sheet 12. When the relative speed is raised, the record density is lowered. When the relative speed is reduced, the record density is raised. As a result, the record density with respect to the set record density of 50% is, as indicated with point P shown in FIG. 5(a), made such that a result of measurement of the record density and the required density coincide with each other. Note that the drum rotational speed conversion table is arranged to have an optimum value corresponding to the temperature (for example, the air temperature) and the humidity realized at the recording operation.

Then, plane halftone dot images having the set record densities stored in the image memory 13, for example, 0%, 10%, 20%, . . . , 90% and 100% is recorded from the image-data processing portion 9 shown in FIG. 1 without use of the input-data-density conversation table 11 (S105).

The plane halftone dot portions recorded at the set record densities were measured by the densitometer 15 to convert the density with respect to the 10% to 90% plane halftone dot portions into halftone dot % C (S106). Thus, a graph indicated with a dashed line shown in FIG. 5A can be obtained.

Figure 5A:
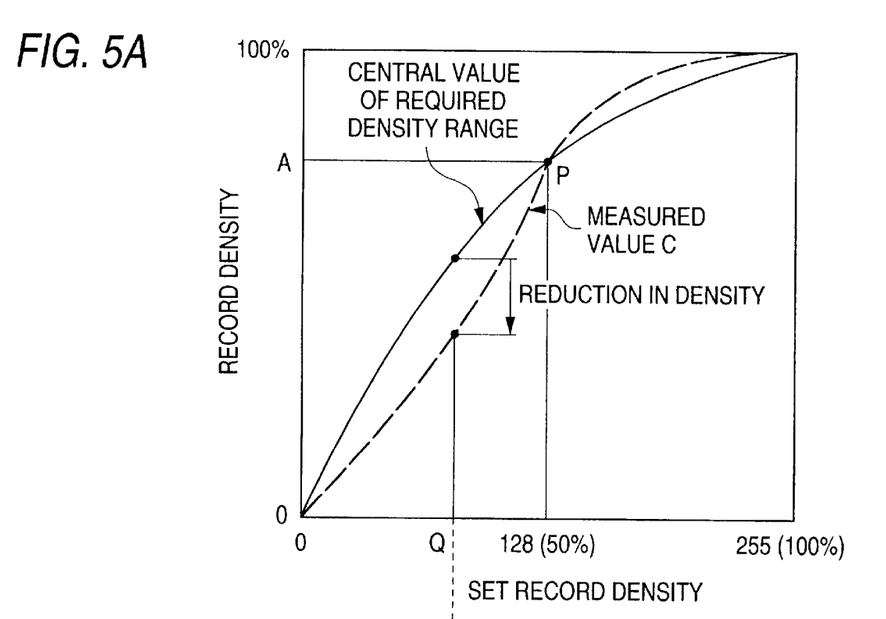
FIG. 5(A) and 5(B) are diagrams showing a method of converting the density of input data of the recording apparatus according to the present invention.
Figure 6:
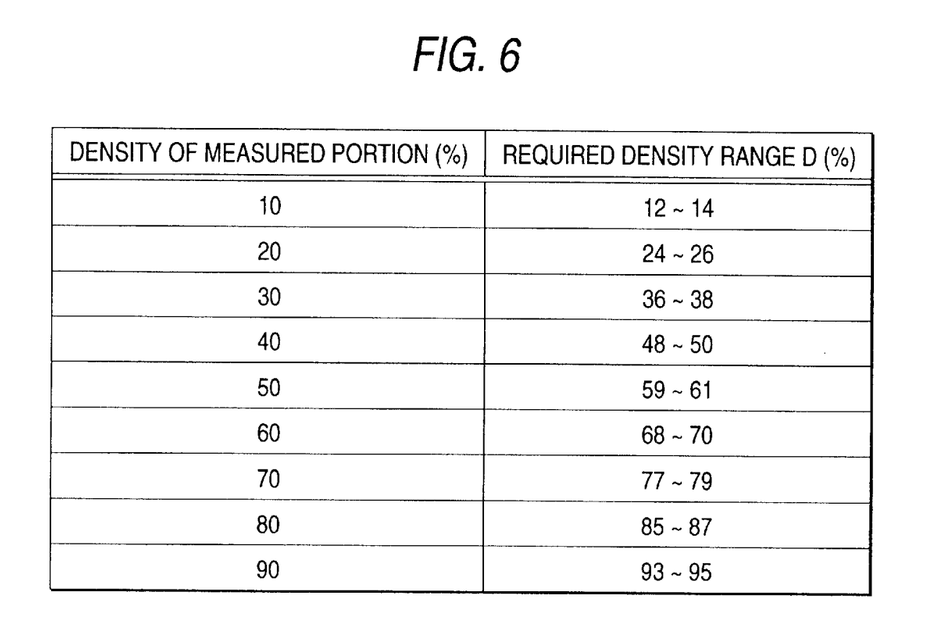
FIG. 6 is a graph showing a required density range of halftone dot % according to the present invention.

Then, as shown in FIG. 6, required density range D with respect to the record density of the plane halftone dot portion is set. FIG. 5A shows a central value of the required density range D by indicated with a solid line. Then, a comparison is made between the central value of the required density range D and the halftone dot % C (S107).

Figure 5B:
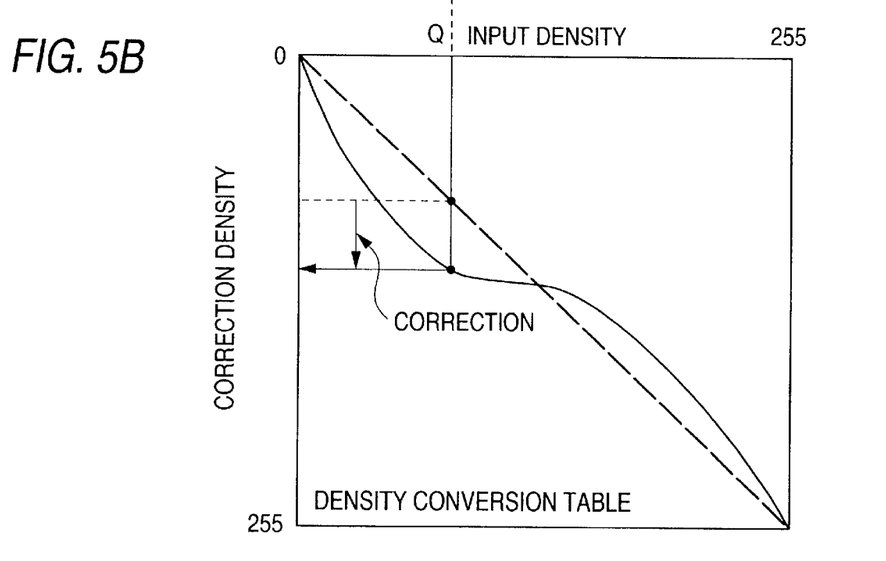

Then, as indicated with a solid line shown in FIG. 5B, an input-data-density conversion table is produced with which density value correction is performed such that the halftone dot % C satisfies the required density-range D (S108). The input-data-density .conversion table, for. example, when a density conversion is performed with respect to set record density Q shown in FIG. 5A, will now be explained. At the set record density Q, the measured value of the halftone dot % C does not coincide with the central value of the required density range, and a reduction in density occurs, as shown in FIG. 5A. In order to make up for the reduction in density, density is raised and corrected in amount of reduced density with respect to the set record density Q as shown in FIG. 5B. Curved line S obtained by finding the correction amount with respect to overall input density corresponds to the input-data-density conversion table. The curved line S may be found by exactly calculating for each correction amount with respect to overall input density, and also may be found easily by interpolation calculation, for example interpolation method, from some points of the typical density value. As a result of the foregoing correction, conversion to the densities with which required densities can be realized in the overall record density range from highlight to shadow.

The thus-produced density conversion table of input data is stored in the input-data-density conversion table 11 shown in FIG. 1. In accordance with the input-data-density conversion table 11, image data input to the controller 84 from the exterior is corrected. As a result, undesirable change in the substantial density (the density in a case of a density gradation system and a record area ratio in a case of a system halftone dot images are recorded) of the image which is recorded on the image receiving sheet 12 can be prevented in case where dimension errors of the elements, difference of the recording materials between lots and change of the laser output as time elapses occur.

As described above, the density correction apparatus 100 according to the present invention is arranged such that the rotational speed of the recording rotational drum 34 is changed to adjust the relative speed between the image receiving sheet 12 and the toner sheet 10 and the recording head 17. Thus, the amount of heat energy which is applied to the toner sheet 10 is adjusted so as to adjust the density of the image which is recorded on the image receiving sheet 12. Therefore, the density can adequately be corrected in the overall density levels from highlight to shadow. The conventional correction method is arranged such that the electric current which is supplied to the laser output apparatus for performing exposure or time for which the electric current is supplied to perform exposure is changed to correspond to the situation. As compared with the conventional method, the structure and control of the recording apparatus 2 can considerably be simplified. Since the laser output can maximally be used, the recording performance, such as the recording speed of the recording apparatus 2, can maximally be used.

Figure 7:
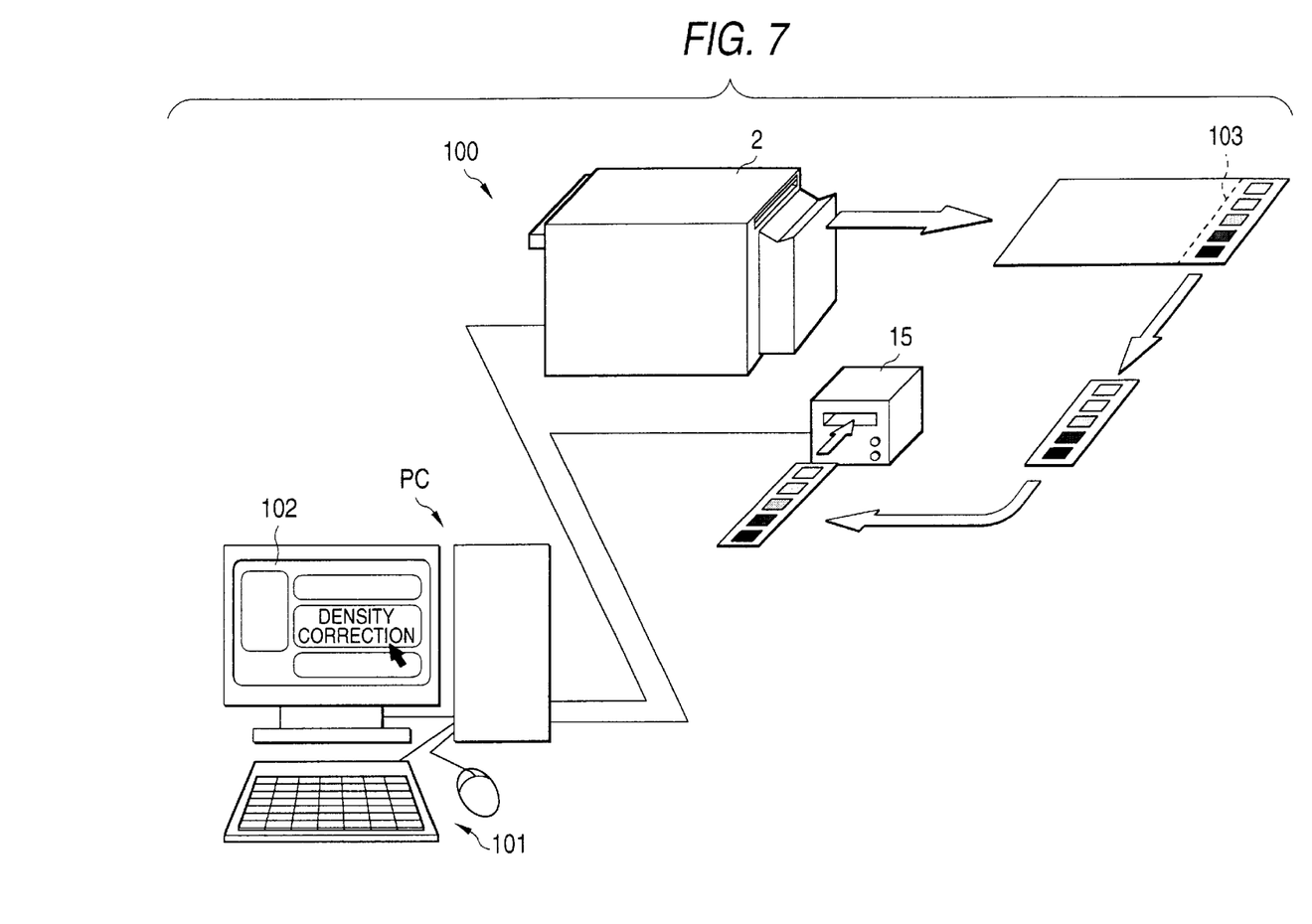
FIG. 7 is a diagram showing an erection example of density correction apparatus.

Next, an erection example of a density correction apparatus 100 will now be explained with reference to FIG. 7. The density correction apparatus 100 semiautomatically performs the above-described recording step by the computer PC such as a personal computer and like, PC is connected at least a recording apparatus 2 and a densitomator 15 shown in FIG. 2 via interface. Relative speed setting value changing means (a rotational-speed setting portion 22) and input data density conversion table updating means (input-data-density conversion table 11 and CPU 15) are provided in the PC. The recording apparatus 2 corresponds to the first and second recording means.

The density correction steps by the density correction apparatus 100 are as follows:

(1) an operator selects "density correction" displayed on a monitor 102 by clicking or pressing the mouse or the key of the keyboard or the like in an input section 101, by using a GUI (Graphical User Interface) of the PC;

(2) PC changes the conversion mode with respect to the input-data-density conversion table to no correction mode, and directs the image output device 110 to change the rotational speed of the recording rotational drum 34 to the standard rotational speed;

(3) PC outputs the image data at a predetermined halftones density to the recording apparatus 2. The image data includes data of a cutting line 103 for cutting only the necessary part of the image output result in order that the image output result is read by the densitomater 15 later;

(4) the recording apparatus 2 print the image data input from PC at the directed rotational speed of the recording rotational drum 34 (operation by the first recording means);

(5) PC displays instructions for the operator on the monitor 102, for example, "when the print operation ends, please transfer the image to the designated printing paper, and cutting along with designated cutting line, and insert the paper into the densitomater in the designated direction. If you complete the foregoing steps, please click the OK button";

(6) the operator performs the operation described above;

(7) PC sends the direction data designating the density measurement location to the densitomater 15, and directs the start of the density measurement;

(8) densitomater 15 performs the density measurement at the location designated by direction data from PC (five points in the example by drawing);

(9) densitomater 15 sends the density measurement data of designated location (5 points) to PC;

(10) PC receives the density measurement data (5 points), and compares with the required density data (5 points);

(11) PC finds the correction value of the drum rotation speed by correcting the rotational speed when measured density of n % (e.g. n=50) is $D_n$, required density is $Ds_n$, and the standard rotational speed is Rs, the rotational speed correction corrects the drum rotation speed R formulated as follows:

$$R = Rs - \{(D_{50} - Ds_{50}) - (D_0 - Ds_0)\}$$

means a coefficient, which is previously found and stored in PC. Then, the recording density can be coincided with the required density at the density of n %. However, in this step, error remains at the density of except n % (e.g. 20% or 80%). This error is found by using the input data density conversion table as shown in FIG. 5 in accordance with the required density range with respect to each density, and the interpolation calculation may be used at the same time;

(12) PC directs the recording apparatus 2 the rotation speed found by relative speed setting value changing means. Further, the density conversion table is set with respect to correction program by using the input-data-density conversion table updating means;

(13) PC makes the display of monitor 102 indicate "end correction."

The foregoing density correction can perform the operation for required colors at once, by means of printing the image of halftone density for each color at once, and measuring the density of the image output result regarding the each color.

As described above, the density correction method for a recording apparatus and the density correction apparatus according to the present invention are arranged such that the relative speed between the recording head and the recording medium is changed to enable the density of the recorded image to be adjusted. Therefore, a prescribed halftones density can be adjusted. Further, density value of the input data is converted in accordance with the recording result recorded as at least two halftones. Therefore, the density can be adjusted adequacy in the overall gradation range by simple control. As a result, the productivity in the recording operation of the recording apparatus can maximally be improved because the energy applied to the recording head can maximally be used.

What is claimed is:

1. A density correction method for a recording apparatus which performs recording by applying energy corresponding to input data from a recording head to a recording medium, said density correction method comprising steps of:
   recording an image on said recording medium at a predetermined halftone density;
   measuring record density of a result of recording of the halftone density;
   changing the setting value of a relative speed between said recording head and said recording medium by means of raising the relative speed when the measured record density is higher than the required density and lowering the relative speed when the measured record density is lower than the required density;
   recording an image on said recording medium at least two halftone densities after changing the setting value of the relative speed; and
   updating a density conversion table for converting input data in such a manner that the record density of a result of recording substantially coincides with the predetermined density.

2. The density correction method according to claim 1, wherein said recording head is a laser recording head for outputting a laser beam, and said recording medium is a laser thermal transfer material on which an image is formed owing to irradiation with said laser beam.

3. The density correction method according to claim 2, wherein said relative-speed setting value is changed from the recorded halftone density in accordance with the correspondence between a record density, which has been measured, and the relative speed.

4. The density correction method according to claim 1, wherein said relative-speed setting value is changed from the recorded halftone density in accordance with the correspondence between a record density, which has been measured, and the relative speed.

5. The method of claim 1, wherein the density conversion table is determined based upon difference values between a measured halftone density and corresponding target density according to at least one of: a plurality of difference values and an interpolation of the difference values.

6. The method of claim 1, wherein the setting value of the relative speed is determined according to humidity conditions.

7. A density correction apparatus for a recording apparatus which performs recording by applying energy corresponding to input data from a recording head to a recording medium, said density correction apparatus comprising:
   a first recorder which records an image on said recording medium at a predetermined halftone density;
   a relative speed setting value changer which measures the recording density of the first image and which changes the setting value of the relative speed between said recording head and said recording medium by means of raising the relative speed when the measured record density is higher than the required density and lowering the relative speed when the measured record density is lower than the required density;
   a second recorder which records images on said recording medium at least two halftone densities after a set value of the relative speed has been changed; and
   input-data-density conversion table updater which updates a density conversion table for converting input data in such a manner that the recorded density of the second image substantially coincides with the predetermined density.

8. The density correction apparatus according to claim 7, wherein said recording head is a laser recording head for outputting a laser beam, and said recording medium is a laser thermal transfer material on which an image is formed owing to irradiation with said laser beam.

9. The density correction apparatus according to claim 8, wherein said relative speed changer means sets the relative speed from the recorded halftone density in accordance with the correspondence between a record density, which has been measured, and the relative speed.

10. The density correction apparatus according to claim 7, wherein said relative speed changer sets the relative speed from the recorded halftone density in accordance with the correspondence between a record density, which has been measured, and the relative speed.

11. The apparatus of claim 7, wherein the density conversion table is determined based upon difference values between a measured halftone density and corresponding target density according to at least one of: a plurality of difference values and an interpolation of the difference values.

12. The apparatus of claim 7, wherein the setting value of the relative speed is determined according to humidity conditions.

* * * * *